R. H. ENGELBERT.
LOCKING DEVICE FOR BELT SHIFTERS.
APPLICATION FILED APR. 25, 1913.
1,204,421.
Patented Nov. 14, 1916.
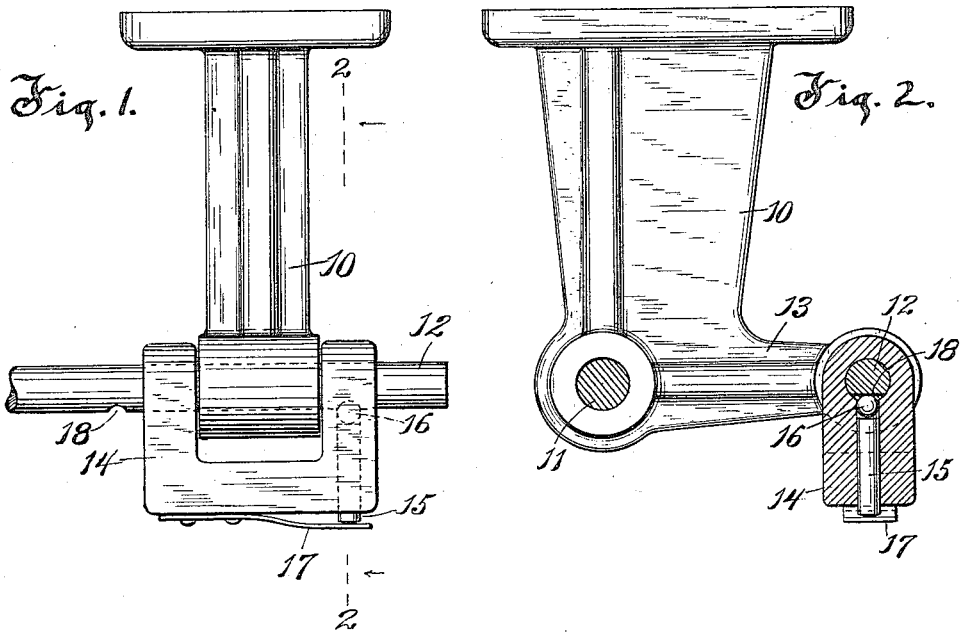
WITNESSES
Arthur F. Miller.
Katherine Holt
INVENTOR.
Rudolph H. Engelbert
By Morsell & Caldwell
ATTORNEYS

UNITED STATES PATENT OFFICE.

RUDOLPH H. ENGELBERT, OF MILWAUKEE, WISCONSIN, ASSIGNOR OF ONE-FOURTH TO HANS E. BIRKHOLZ, OF MILWAUKEE, WISCONSIN, AND ONE-HALF TO INTERNATIONAL HARVESTER CORPORATION, A CORPORATION OF NEW JERSEY.

LOCKING DEVICE FOR BELT-SHIFTERS.

1,204,421.   Specification of Letters Patent.   Patented Nov. 14, 1916.

Application filed April 25, 1913. Serial No. 763,490.

*To all whom it may concern:*

Be it known that I, RUDOLPH H. ENGELBERT, a citizen of the United States, and resident of Milwaukee, in the county of Milwaukee and State of Wisconsin, have invented new and useful Improvements in Locking Devices for Belt-Shifters, of which the following is a description, reference being had to the accompanying drawings, which are a part of this specification.

This invention has for its object to provide means for preventing the slipping of a belt shifter from either the running or the idle position.

It has been customary to provide a means for shifting the belt from a fixed pulley to a loose pulley on a countershaft by means of a sliding rod having fork arms embracing the belt and when the belt is in connection with the loose pulley so as not to drive the machine which is belted to the countershaft there is no means for positively holding the belt shifter in this position and the vibration of the machinery and other causes have in a number of cases caused the belt shifter to move so as to carry the belt from the loose pulley to the fixed pulley and thus unexpectedly start the machinery in operation with injury to the operator.

The present invention is designed to apply to the ordinary belt shifter in general use and to effectively prevent its changing its position except when it is forcibly operated by hand.

With the above and other objects in view the invention consists in the locking device for belt shifters as herein claimed and all equivalents.

Referring to the accompanying drawings in which like characters of reference indicate the same parts in different views: Figure 1 is a front elevation of a locking device for belt shifters which constitutes the form of the invention. Fig. 2 is a sectional view thereof on the plane of line 2—2 of Fig. 1.

In these drawings 10 indicates a shaft hanger bracket forming a bearing for a countershaft 11 and 12 is the usual sliding rod forming a part of the belt shifter for the countershaft, said sliding rod being slidably mounted in projecting arms 13 of the shaft hanger brackets 10. A U-shaped frame 14 with the space between its projecting arms sufficient to fit on opposite sides of the hanger bracket 10 is slipped in place thereon so that the sliding rod 12 passes through openings in said arms as well as through its bearings in the hanger bracket. One of the arms of the U-shaped frame has an opening extending lengthwise through it and within this opening is fitted a sliding pin 15 bearing at its upper end against a ball 16 and pressed upwardly against the ball by means of a leaf spring 17 on the bottom of the frame and which bears against the projecting end of said pin as shown in Fig. 1. One or more notches 18 are cut in the belt shifter sliding rod 12 and the ball 16 under the pressure of the spring enters these notches to securely lock the belt shifter rod 12 in its different operative positions. The locking engagement of the ball with the notches of the sliding rod is such that it may be easily overcome by force in throwing the belt shifter by hand in the usual manner, but is sufficient to prevent accidental change in position of the belt shifter.

This form of the device is adapted for use with the belt shifters that have been installed without necessitating a material change thereof, the only actual change in the belt shifter construction being the filing of the notches 18 in the sliding rod 12.

It is obvious that various modifications of my invention may be made and it is my intention to cover all such modifications which do not involve a departure from the spirit and scope of my invention as set forth in the following claims.

What I claim as new is:

1. A locking device for belt shifters, comprising a U-shaped frame having its arms spaced apart to fit on opposite sides of a hanger bracket and provided with openings through which the sliding rod of the belt shifter passes, there being a longitudinal opening through one of the arms of the frame, a ball contained within the opening, a pin fitting in the opening and bearing on the ball, and a spring secured to the frame and bearing against the end of the pin for forcing the ball into a notch of the sliding rod.

2. A locking device for belt shifters, comprising a U-shaped frame having its arms spaced apart to fit on opposite sides of a hanger bracket and provided with openings through which the sliding rod of a belt shifter passes, there being another opening in one of the arms of the frame, a member in said other opening, and a flat spring secured to said frame and acting to force said member into a notch of the sliding rod.

In testimony whereof, I affix my signature, in presence of two witnesses.

RUDOLPH H. ENGELBERT.

Witnesses:
R. S. C. CALDWELL,
KATHERINE HOLT.

Copies of this patent may be obtained for five cents each, by addressing the "Commissioner of Patents, Washington, D. C."